US009596043B2

(12) United States Patent
Yang

(10) Patent No.: US 9,596,043 B2
(45) Date of Patent: Mar. 14, 2017

(54) QUALITY PREDICTION METHOD AND DEVICE FOR PHYSICAL DOWNLINK CONTROL CHANNEL OF LONG TERM EVOLUTION SYSTEM

(71) Applicant: ZTE Corporation, Shenzhen (CN)

(72) Inventor: Yang Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 183 days.

(21) Appl. No.: 14/389,163

(22) PCT Filed: Feb. 27, 2013

(86) PCT No.: PCT/CN2013/071957
§ 371 (c)(1),
(2) Date: Sep. 29, 2014

(87) PCT Pub. No.: WO2013/149523
PCT Pub. Date: Oct. 10, 2013

(65) Prior Publication Data
US 2015/0333854 A1 Nov. 19, 2015

(30) Foreign Application Priority Data

Apr. 6, 2012 (CN) .......................... 2012 1 0099551

(51) Int. Cl.
*H04W 24/08* (2009.01)
*H04W 24/10* (2009.01)
(Continued)

(52) U.S. Cl.
CPC ......... *H04B 17/373* (2015.01); *H04B 17/327* (2015.01); *H04W 24/08* (2013.01); *H04W 24/10* (2013.01); *H04W 84/042* (2013.01)

(58) Field of Classification Search
CPC ... H04B 17/327; H04B 17/373; H04W 24/08; H04W 24/10; H04W 84/042
(Continued)

(56) References Cited

U.S. PATENT DOCUMENTS

| | | | | |
|---|---|---|---|---|
| 2010/0167657 A1* | 7/2010 | Molnar | ................. | H04W 24/10 455/67.11 |
| 2012/0057500 A1* | 3/2012 | Nakayama | ............ | H04W 24/08 370/252 |
| 2013/0033998 A1* | 2/2013 | Seo | ....................... | H04W 24/00 370/252 |

FOREIGN PATENT DOCUMENTS

| | | |
|---|---|---|
| CN | 102036354 A | 4/2011 |
| CN | 102238611 A | 11/2011 |
| WO | 2010131688 A1 | 11/2010 |

OTHER PUBLICATIONS

International Search Report for corresponding application PCT/CN2013/071957 filed Feb. 27, 2013; Mail date Apr. 18, 2013.
(Continued)

*Primary Examiner* — Omer S Mian
*Assistant Examiner* — Nizam Ahmed
(74) *Attorney, Agent, or Firm* — Cantor Colburn LLP

(57) ABSTRACT

Provided are a quality prediction method and device for a physical downlink control channel of a long term evolution system. In the method, a target user equipment (UE) requiring physical downlink control channel (PDCCH) quality prediction is determined, and information reported by the target UE is received. According to the reported information, a prediction index of the target UE is determined, wherein the prediction index is a signal to interference plus noise ratio (SINR) of the control channel or an equivalent reception level ($RP_{PDCCH}$) of the control channel. According to the SINR or the $RP_{PDCCH}$, the PDCCH quality of the target UE is determined. The present document can be applied to
(Continued)

provide more accurate and highly efficient control channel quality prediction for LTE users without adding measurement and signalling, thereby achieving the purpose of providing a quick and precise positioning basis for a control channel element (CCE) resource and power allocation algorithm of an Evolved Node B (eNodeB).

14 Claims, 4 Drawing Sheets

(51) Int. Cl.
    *H04B 17/373*     (2015.01)
    *H04B 17/327*     (2015.01)
    *H04W 84/04*     (2009.01)

(58) Field of Classification Search
    USPC .......................................... 370/252
    See application file for complete search history.

(56) References Cited

OTHER PUBLICATIONS

European Search Report for corresponding application EP 1377 2778; Report Issued Apr. 10, 2015.
Kyocera: "Potential Performance of Range Expansion and PDCCH Interference Magagement" 3GPP Draft; vol. RAN WG1, No. 20100628, Jun. 22, 2010, XP050449370.

* cited by examiner

QUALITY PREDICTION METHOD AND DEVICE FOR PHYSICAL DOWNLINK CONTROL CHANNEL OF LONG TERM EVOLUTION SYSTEM

TECHNICAL FIELD

The present document relates to the communication field, and in particular relates to a quality prediction method and device for a physical downlink control channel of a long term evolution system.

BACKGROUND

The physical downlink control channel (PDCCH) is an important physical channel in the standards of third generation partnership project (3GPP) long term evolution (LTE) and long term evolution-advanced (LTE-A). Downlink control signalling is borne by the PDCCH and is located on the first N orthogonal frequency division multiplexing symbols of each downlink subframe, wherein N is less than or equal to 4.

The downlink control signalling includes the following two parts of contents: 1. a downlink transport format (DTF), a downlink shared channel (DL-SCH), a physical resource allocation result of two transmission channels of a paging channel and DL-SCH related hybrid auto retransmission quest (HARQ) information; and 2. an uplink transport format (UTF), a physical resource allocation result of an uplink shared channel (UL-SCH) and UL-SCH related HARQ information.

In a current downlink subframe, each scheduled UE may detect one or more PDCCHs at the same time. Different PDCCH coding efficiencies are determined by different control channel element (CCE) polymerization degrees and downlink control information (DCI) formats. Each control channel corresponds to a certain x radio network temporary identifier (x-RNTI), and the x-RNTI is configured to user equipment (UE) by high-layer signalling in advance.

A load capacity and power allocation method of the PDCCH have no necessary connection with the load capacity and power allocation method of the physical downlink shared channel (PDSCH) on the same subframe, and depend on a radio resource management algorithm of a device. Generally, 100% resource utilization rate may be achieved for the PDSCH through a proper media access control (MAC) algorithm, therefore, the interference level of an adjacent cell introduced to OFDM symbols where the PDSCH is located is relatively stable. However, a control channel is usually not operated in a full load state, and a PDCCH mapping pattern may change suddenly with the change of the subframe, there are different PDCCH power allocation algorithms, thus easily rendering relatively severe interference fluctuation of an adjacent cell into a control channel region. Therefore, even though it is considered that the PDCCH and the PDSCH experience the same channel fading (or correlation time of a channel is longer than the time length of one subframe), the channel quality prediction to the PDCCH needs to differ from the channel quality prediction to the PDSCH.

However, in the related art, with respect to the channel quality prediction of the PDCCH, an accurate and highly efficient control channel quality prediction method is not given in relevant protocols, and thus a rapid and accurate positioning basis cannot be provided for control channel element resource and power allocation algorithms of an Evolved Node B (eNodeB).

SUMMARY

Provided are a quality prediction method and device for a physical downlink control channel of a long term evolution system, so as to solve at least one of the above-mentioned problems.

According to one embodiment of the present document, a quality prediction method for a physical downlink control channel of a long term evolution system is provided, including: determining target user equipment (UE) requiring physical downlink control channel (PDCCH) quality prediction, and receiving information reported by the target UE; determining a prediction index of the target UE according to the reported information, wherein the prediction index is a signal to interference plus noise ratio (SINR) of the control channel or an equivalent reception level $RP_{PDCCH}$ of the control channel; and determining PDCCH quality of the target UE according to the SINR or the $RP_{PDCCH}$.

In the described embodiment, determining the target UE requiring the PDCCH quality prediction and receiving the information reported by the target UE include: locking the target UE in a target cell and receiving the reported information which is obtained by the target UE through measurement, wherein the reported information includes: reference signal received power (RSRP) of a plurality of cells.

In the described embodiment, determining the SINR of the control channel of the target UE according to the reported information includes: dividing the RSRP of the plurality of cells into RSRP measurement of a serving cell $RSRP_S$, RSRP measurement of an X-class co-channel interference adjacent cell $RSRP_X$, and RSRP measurement of a Y-class co-channel interference adjacent cell $RSRP_Y$, wherein a resource element (RE) pattern occupied by a cell reference signal (Cell RS) of the X-class co-channel interference adjacent cell is completely identical with an RE pattern occupied by a Cell RS of a target cell, and the RE pattern occupied by a Cell RS of the Y-class co-channel interference adjacent cell is totally different from the RE pattern occupied by the Cell RS of the target cell; determining an actual power offset $K_S$ of the PDCCH of the target UE relative to the Cell RS, an average power offset $K_X$ of the PDCCH of the X-class co-channel interference adjacent cell relative to the Cell RS and an average power offset $K_Y$ of the PDCCH of the Y-class co-channel interference adjacent cell relative to the Cell RS; and determining the SINR according to the following formula:

$$SINR = \frac{RSRP_S \cdot K_S}{\sum RSRP_X \cdot K_X + [\alpha \sum RSRP_Y + (1-\alpha) \sum RSRP_Y \cdot K_Y] + N} \frac{1}{Load_{CCH}} K_{CCE},.$$

where $\alpha$ is a ratio of REs occupied by the Cell RS to all interference source REs of the Y-class co-channel interference adjacent cell which are located in a control channel region, N is an additive white noise, $Load_{CCH}$ is an average load on the control channel of strong interfering cells, and $K_{CCE}$ is a polymerization degree compensation factor and is adjusted according to demodulation performance of different polymerization degrees.

In the described embodiment, determining the average power offset $K_X$ of the PDCCH of the X-class co-channel interference adjacent cell relative to the Cell RS includes: semi-statically calculating the $K_X$ according to a power allocation algorithm of PDCCH of an adjacent cell; and determining the average power offset $K_Y$ of the PDCCH of the Y-class co-channel interference adjacent cell relative to the Cell RS includes: semi-statically calculating the $K_Y$ according to the power allocation algorithm of PDCCH of an adjacent cell.

In the described embodiment, during the determination of the SINR, determining the value of a includes: determining the value of a according to antenna port configuration information of an adjacent cell and control format index (CFI) information indicated by a physical control format index channel (PCFICH).

In the described embodiment, the value of a includes:

$$\alpha = \begin{cases} 0.125 & CFI = 3 \text{ \& two antenna ports} \\ 0.286 & CFI = 3 \text{ \& four antenna ports} \\ 0.200 & CFI = 2 \text{ \& two antenna ports} \\ 0.500 & CFI = 2 \text{ \& four antenna ports}. \end{cases}$$

In the described embodiment, during the determination of the SINR, determining the value of $Load_{CCH}$ includes: determining $Load_{CCH}$ according to a load control algorithm of PDCCH of the adjacent cell.

In the described embodiment, determining the equivalent reception level $RP_{PDCCH}$ of the control channel of the target UE according to the reported information includes: determining the $RP_{PDCCH}$ according to the following formula: $RP_{PDCCH} = RSRP_s \cdot K_s \cdot K_{CCE}$ where $RSRP_s$ is RSRP measurement of a serving cell, $K_s$ is an actual power offset of the PDCCH of the target UE relative to a Cell RS, and $K_{CCE}$ is a polymerization degree compensation factor and is adjusted according to demodulation performance of different polymerization degrees.

In the described embodiment, determining the actual power offset $K_S$ of the PDCCH of the target UE relative to the Cell RS includes: obtaining, by using a reporting period of each RSRP as an observing window, a downlink scheduling subframe or an uplink grant subframe corresponding to the target UE; according to the downlink scheduling subframe or the uplink grant subframe, obtaining and recording PDCCH power allocation results; and judging whether a polymerization degree of the target UE changes in the observing window; if the polymerization degree does not change in the observing window, calculating the $K_s$ according an average value of the PDCCH power allocation results, and if the polymerization degree changes in the observing window, calculating the $K_s$ according a power used by a last updated polymerization degree of the target UE.

In the described embodiment, determining the value of $K_{CCE}$ includes: judging whether a CCE polymerization degree allocated by the serving cell for the target UE changes in the reporting period of each RSRP; if the CCE polymerization degree changes in the observing window, then determining a last updated CCE polymerization degree as the $K_{CCE}$, and if the CCE polymerization degree does not change in the observing window, then selecting the value of the $K_{CCE}$ according to the CCE polymerization degree allocated by the serving cell.

In the described embodiment, the value of the $K_{CCE}$ includes:

$$K_{CCE} = \begin{cases} dB2Linear(-2) & 1CCE \\ dB2Linear(0) & 2CCE \\ dB2Linear(2) & 4CCE \\ dB2Linear(4) & 8CCE. \end{cases}$$

According to another embodiment of the present document, a quality prediction device for a physical downlink control channel of a long term evolution system is provided, including: a determination and reception module, which is configured to determine target user equipment (UE) requiring physical downlink control channel (PDCCH) quality prediction, and receive information reported by the target UE; a first determination module, which is configured to determine a prediction index of the target UE according to the reported information, wherein the prediction index is a signal to interference plus noise ratio (SINR) of the control channel or an equivalent reception level $RP_{PDCCH}$ of the control channel; and a second determination module, which is configured to determine the PDCCH quality of the target UE according to the SINR and the $RP_{PDCCH}$.

In the described embodiment, the determination and reception module includes: a locking and reception unit, which is configured to lock the target UE in a target cell and receive the reported information which is obtained by the target UE through measurement, wherein the reported information includes: reference signal received power (RSRP) of a plurality of cells.

In the described embodiment, the first determination module includes: a division unit, which is configured to divide the RSRP of the plurality of cells into RSRP measurement of a serving cell $RSRP_s$, RSRP measurement of an X-class co-channel interference adjacent cell $RSRP_X$, and RSRP measurement of a Y-class co-channel interference adjacent cell $RSRP_Y$, wherein a resource element (RE) pattern occupied by a cell reference signal (Cell RS) of the X-class co-channel interference adjacent cell is completely identical with an RE pattern occupied by a Cell RS of the target cell, and the RE pattern occupied by a Cell RS of the Y-class co-channel interference adjacent cell is totally different from the RE pattern occupied by the Cell RS of the target cell; a first determination unit, which is configured to determine an actual power offset $K_S$ of the PDCCH of the target UE relative to the Cell RS, an average power offset $K_X$ of the PDCCH of the X-class co-channel interference adjacent cell relative to the Cell RS and an average power offset $K_Y$ of the PDCCH of the Y-class co-channel interference adjacent cell relative to the Cell RS; and a second determination unit, which is configured to determine the SINR according to the following formula:

$$SINR = \frac{RSRP_S \cdot K_S}{\sum RSRP_X \cdot K_X + [\alpha \sum RSRP_Y + (1-\alpha)\sum RSRP_Y \cdot K_Y] + N} \frac{1}{Load_{CCH}} K_{CCE},$$

where α is a ratio of REs occupied by the Cell RS to all interference source REs of the Y-class co-channel interference adjacent cell which are located in a control channel region, N is an additive white noise, $Load_{CCH}$ is an average load on the control channel of strong interfering cells, and $K_{CCE}$ is a polymerization degree compensation factor and is adjusted according to demodulation performance of different polymerization degrees.

In the described embodiment, the first determination module includes: a third determination unit, which is configured to determine the $RP_{PDCCH}$ according to the following formula: $RP_{PDCCH}=RSRP_s \cdot K_s \cdot K_{CCE}$, where $RSRP_S$ is RSRP measurement of a serving cell, $K_s$ is an actual power offset of the PDCCH of the target UE relative to the Cell RS, and $K_{CCE}$ is a polymerization degree compensation factor and is adjusted according to demodulation performance of different polymerization degrees.

By means of the above embodiments of the present document, quality prediction can be performed on the physical downlink control channel according to the signal to interference plus noise ratio (SINR) of the control channel or the equivalent reception level $RP_{PDCCH}$ of the control channel, the problem that an accurate and highly efficient control channel quality prediction method is not given in the existing algorithms is solved, and thus the effect of providing a quick and accurate positioning basis for a control channel element resource and power allocation algorithm of an Evolved Node B (eNodeB) is achieved.

DESCRIPTION OF THE DRAWINGS

Drawings, provided for further understanding of the present document and forming a part of the specification, are used to explain the present document together with embodiments of the present document rather than to limit the present document. In the accompanying drawings.

SPECIFIC IMPLEMENTATIONS

The example embodiments are described in conjunction with the drawings as follows. It should be noted that the embodiments and the characteristics of the embodiments can be combined with each other if no conflict is caused.

In the related art, the measurement of the RSRP is performed by using reference signals on an antenna port 0 (AP0) used by a multiple input multiple output (MIMO) in the LTE or all reference signals on the AP0 and AP1 as a set of measurement sources. In the measurement bandwidth specified by protocols, selecting the cell reference signals (Cell RSs) on which resource elements (REs) as the RSRP measurement points is determined by the UE itself.

Figure 1:
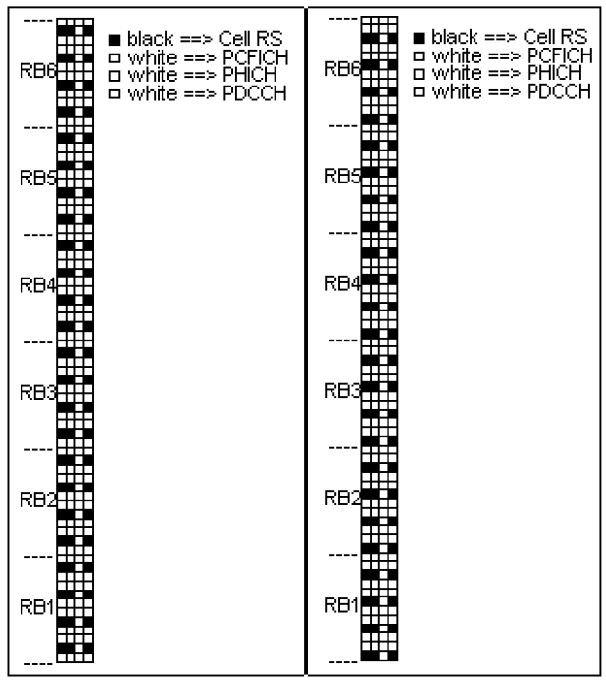
FIG. 1 is a schematic diagram of an adjacent cell interference pattern of a control channel according to the related art.

FIG. 1 is a schematic diagram of an adjacent cell interference pattern of a control channel according to the related art. As shown in FIG. 1, FIG. 1 shows a detailed mapping pattern of channels, such as the PDCCHs, and signals of two adjacent cells on a specific subframe. As shown in FIG. 1, since the Cell RS physical resource mapping has different offsets according to different cell numbers, therefore, the interference to the PDCCH of the target cell may be from reference signals, PDCCHs or empty subframes of the adjacent cell, and such complex interference situations increase the fluctuation of channel prediction and reduce the accuracy of channel prediction. Therefore, when a typical PDCCH is not full-loaded, whereas the PDSCH is full-loaded (or loads on the control channel and on the service channel are not uniform), on the premise that the Evolved Node B (eNodeB) knows the PDCCH load in advance, reporting can be performed through the measurement of the RSRP of the target cell and strong interfering adjacent cell of the UE.

On the basis of the above-mentioned analyses, in the embodiments of the present document, the PDCCH channel quality is predicted according to the following two prediction indexes: an equivalent reception level ($RP_{PDCCH}$) of the control channel or a signal to interference plus noise ratio (SINR) of the control channel. The definitions of the two prediction indexes are described as follows.

As regards the equivalent reception level ($RP_{PDCCH}$), the target link performance of the serving cell is considered, and the influence of the CCE polymerization degree allocated for the target UE on the demodulation performance is considered simultaneously.

The formula $RP_{PDCCH}=RSRP_s \cdot K_s \cdot K_{CCE}$ is used to predict the PDCCH channel quality.

As regards the signal to interference plus noise ratio (SINR) of the control channel, the adjacent cell interference type (Cell RS or PDCCH), the adjacent cell interference power level and the adjacent cell interference load level are refined on the basis of $RP_{PDCCH}$.

The formula $$SINR = \frac{RSRP_S \cdot K_S}{\sum RSRP_X \cdot K_X + [\alpha \sum RSRP_Y + (1-\alpha)\sum RSRP_Y \cdot K_Y] + N} \cdot \frac{1}{\text{Load}_{CCH}} \cdot K_{CCE}$$

is used to predict the PDCCH channel quality.

Specifically, predicting the control channel quality according to the SINR has the following advantages: the influence of adjacent cell interference, especially the Cell RS interference, on channel quality estimation can be fully considered.

Figure 2:
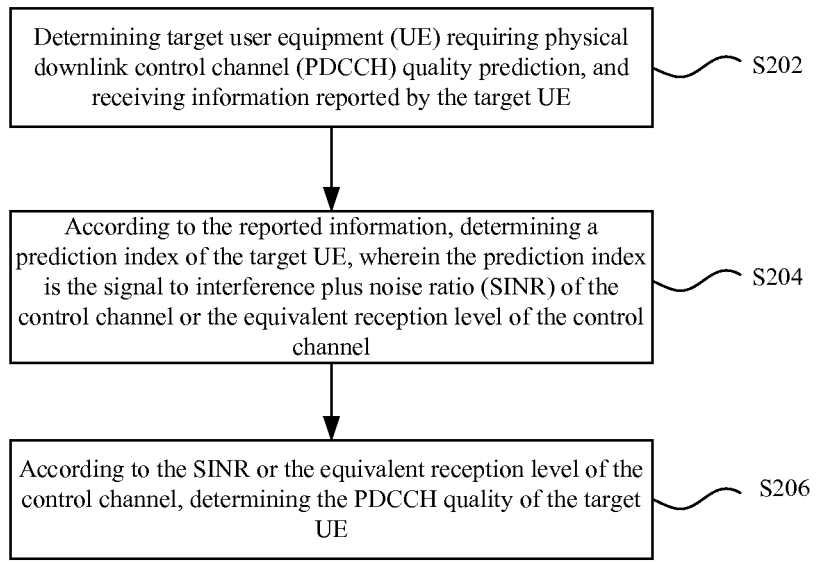
FIG. 2 is a flowchart of a quality prediction method for a physical downlink control channel of a long term evolution system according to an embodiment of the present document.

FIG. 2 is a flowchart of a quality prediction method for a physical downlink control channel of a long term evolution system according to an embodiment of the present document. As shown in FIG. 2, the method includes the following steps (steps S202-S206).

In Step S202, target user equipment (UE) requiring physical downlink control channel (PDCCH) quality prediction is determined, and information reported by the target UE is received.

In Step S204, a prediction index of the target UE is determined according to the reported information, wherein the prediction index is the signal to interference plus noise ratio (SINR) of the control channel or the equivalent reception level ($RP_{PDCCH}$) of the control channel.

In Step S206, the PDCCH quality of the target UE is determined according to the SINR or the $RP_{PDCCH}$.

In this embodiment, the procedure of determining the target user equipment (UE) requiring PDCCH quality prediction and receiving information reported by the target UE may be performed by using the following method: locking the target UE in a target cell and receiving the reported information which is obtained by the target UE through measurement, wherein the reported information includes: the reference signal received power (RSRP) of a plurality of cells.

In this embodiment, the signal to interference plus noise ratio (SINR) of the control channel of the target UE may be further determined after the reference signal received power (RSRP) of a plurality of cells is obtained. Firstly, the RSRP of the plurality of cells may be divided into the RSRP measurement of a serving cell $RSRP_s$, the RSRP measurement of an X-class co-channel interference adjacent cell $RSRP_x$, and the RSRP measurement of a Y-class co-channel interference adjacent cell $RSRP_y$, wherein the RE pattern occupied by the Cell RS of the X-class co-channel interference adjacent cell is completely identical with the RE pattern occupied by the Cell RS of the target cell, and the RE pattern occupied by the Cell RS of the Y-class co-channel interference adjacent cell is totally different from the RE pattern occupied by the Cell RS of the target cell. Then, the actual power offset $K_S$ of the PDCCH of the target UE relative to the Cell RS, the average power offset $K_X$ of the PDCCH of the X-class co-channel interference adjacent cell relative to the Cell RS and the average power offset $K_Y$ of the PDCCH of the Y-class co-channel interference adjacent cell relative to the Cell RS are determined. Finally, the SINR may be determined according to the following formula:

$$SINR = \frac{RSRP_S \cdot K_S}{\sum RSRP_X \cdot K_X + [\alpha \sum RSRP_Y + (1-\alpha) \sum RSRP_Y \cdot K_Y] + N} \frac{1}{Load_{CCH}} K_{CCE},$$

wherein $\alpha$ is a ratio of REs occupied by the Cell RS to all interference source REs of the Y-class co-channel interference adjacent cell which are located in a control channel region, where N is an additive white noise, $Load_{CCH}$ is an average load on the control channel of strong interfering cells, and $K_{CCE}$ is a polymerization degree compensation factor and is adjusted according to the demodulation performance of different polymerization degrees.

In practical applications, each parameter in the formula for determining the SINR can be determined, for example, through the following method: (1) the average power offset $K_X$ of the PDCCH of the X-class co-channel interference adjacent cell relative to the Cell RS may be semi-statically calculated according to a power allocation algorithm of PDCCH of an adjacent cell; and (2) the average power offset $K_Y$ of the PDCCH of the Y-class co-channel interference adjacent cell relative to the Cell RS may be semi-statically calculated according to a power allocation algorithm of PDCCH of an adjacent cell.

In practical applications, during the determination of the SINR, the value of a is also required to be determined. For example, the value of a may be determined according to antenna port configuration information of an adjacent cell and control format index (CFI) information indicated by a physical control format index channel (PCFICH). The value of a includes the follows:

$$\alpha = \begin{cases} 0.125 & CFI = 3 \text{ \& two antenna ports} \\ 0.286 & CFI = 3 \text{ \& four antenna ports} \\ 0.200 & CFI = 2 \text{ \& two antenna ports} \\ 0.500 & CFI = 2 \text{ \& four antenna ports.} \end{cases}$$

In practical applications, the $Load_{CCH}$ can be determined according to a load control algorithm of PDCCH of the adjacent cell.

In this embodiment, after the reference signal received power (RSRP) of a plurality of cells are obtained, the equivalent reception level $RP_{PDCCH}$ of the control channel of the target UE can be further determined. The $RP_{PDCCH}$ may be determined according to the following formula: $RP_{PDCCH}=RSRP_s \cdot K_s \cdot K_{CCE}$, where $RSRP_s$ is the RSRP measurement of a serving cell, Ks is the actual power offset of the PDCCH of the target UE relative to the Cell RS, $K_{CCE}$ is a polymerization degree compensation factor and is adjusted according to the demodulation performance of different polymerization degrees.

In the above-mentioned process for determining the signal to interference plus noise ratio (SINR) of the control channel or the equivalent reception level $RP_{PDCCH}$ of the control channel of the target UE, the value of the $K_s$ may be determined according to the following method: obtaining, by using a reporting period of each RSRP as an observing window, a downlink scheduling subframe or an uplink grant subframe corresponding to the target UE; according to the downlink scheduling subframe or the uplink grant subframe, obtaining and recording PDCCH power allocation results; judging whether the polymerization degree of the target UE changes in the observing window; if the polymerization degree does not change in the observing window, calculating the $K_s$ according the average value of the PDCCH power allocation results, and if the polymerization degree changes in the observing window, calculating the $K_s$ according the power used by the last updated polymerization degree of the target UE.

In the above-mentioned process for determining the signal to interference plus noise ratio (SINR) of the control channel or the equivalent reception level $RP_{PDCCH}$ of the control channel of the target UE, the value of the $K_{CCE}$ can be determined according to the following method: judging whether the CCE polymerization degree allocated by the serving cell for the target UE changes in the reporting period of each RSRP; if the CCE polymerization degree changes in the observing window, then determining the last updated CCE polymerization degree as the $K_{CCE}$, and if the CCE polymerization degree does not change in the observing window, then taking the CCE polymerization degree allocated by the serving cell as the $K_{CCE}$. The value of the $K_{CCE}$ may include:

$$K_{CCE} = \begin{cases} dB2Linear(-2) & 1CCE \\ dB2Linear(0) & 2CCE \\ dB2Linear(2) & 4CCE \\ dB2Linear(4) & 8CCE. \end{cases}$$

After each parameter (including: $K_{CCE}$, $Load_{CCH}$, a, $K_X$, $K_Y$ and $K_S$) is determined, the signal to interference plus noise ratio (SINR) of the control channel or the equivalent reception level $RP_{PDCCH}$ of the control channel of the target UE can be determined.

In another example implementation of the present document, the following method can be adopted to implement the above-mentioned quality prediction method for a physical downlink control channel of a long term evolution system.

For example, detailed description is given by taking an eNodeB of a target cell requiring control channel quality prediction thereon as an example, and the same method can be applied to other cells.

(1) A target UE to perform channel quality prediction thereon is locked in a target cell, and according to multi-cell reference signal received power (RSRP) measured and reported by the target UE, a plurality of RSRPs are divided into $RSRP_S$, $RSRP_X$ and $RSRP_Y$.

(2) Taking a reporting period of one RSRP as an observing window, a subframe on which the UE obtains downlink scheduling or uplink grant subframe is obtained, PDCCH power allocation results of the UE are recorded, and the power of the Cell RS can be considered to be static. If the polymerization degree of the UE does not change in the observing window, when the $K_S$ is calculated, the average value of a plurality of allocated PDCCH powers is taken as the basis to determine the $K_S$; and if the polymerization degree of the UE changes in the observing window, then the PDCCH power used by the latest polymerization degree of the UE is taken as the basis to determine the $K_S$.

(3) The average power offset of the PDCCH of the interfering adjacent cell relative to the adjacent Cell RS is calculated according to the power allocation algorithm of PDCCH of an adjacent cell, wherein the interfering cell includes the X-class and the Y-class interfering cells, that is, the two parameters $K_X$ and $K_Y$ can be semi-statically calculated according to the PDCCH power allocation algorithm.

(4) The value of a is dynamically selected according to the adjacent cell antenna port configuration and control format information (CFI) indicated by the physical control format indicator channel (PCFICH). In general, the number of antenna ports of the base station side in the entire network is fixed and the CFI is also semi-statically configured, therefore, a is also static.

(5) According to the CCE resource allocation algorithm of the adjacent cell PDCCH (that is, the above-mentioned PDCCH load control algorithm), the average load $Load_{CCH}$ of the control channel of the strong interfering adjacent cell is determined. In a general single-layer network (a network with only macro base stations deployed), all the cells can use the same PDCCH load control algorithm, therefore, the $Load_{CCH}$ can also be considered to be static. In a heterogeneous network, low power nodes (LPNs) exist except for macro stations, and the $Load_{CCH}$ can be obtained according to the average value of PDCCH loads of the strong interfering adjacent cells, wherein the PDCCH loads of the strong interfering adjacent cells can be determined through history RSRP data.

(6) Polymerization degree compensation factor $K_{CCE}$ is decided by the PDCCH polymerization degree allocated by the serving cell for the target UE in the RSRP reporting period. If the CCE polymerization degree allocated by the serving cell for the target UE in the reporting period changes, then the compensation factor $K_{CCE}$ is determined according to the latest CCE polymerization degree for channel quality prediction, and if the CCE polymerization degree allocated by the serving cell for the target UE in the reporting period does not change, then the compensation factor $K_{CCE}$ is directly determined according to the CCE polymerization degree allocated by the serving cell for the target UE.

(7) (Optionally) According to the channel quality prediction index SINR, the CCE polymerization degree and power level which is suitable for the use of the target UE can be rapidly located. Alternatively, the channel quality prediction index SINR may assist other algorithms to locate the CCE polymerization degree and power level which is suitable for the use of the target UE.

The above-mentioned quality prediction method for a physical downlink control channel of a long term evolution system is described in detail in combination with specific embodiments as follows.

In this embodiment, a set of parameters which is commonly used in TD-LTE networking is selected as the parameters used in the present embodiment.

Assumption at the base station side, the system bandwidth at downlink is 10 MHz, CFI=3, there are two antenna ports, and single-layer networking is adopted, the entire network uses the same PDCCH power allocation algorithm (full power emission is performed on the OFDM symbols where the PDCCH is located), and the entire network uses the same PDCCH resource allocation algorithm (it is assumed that the load is 90%).

Assumption at the target UE side: 2CCE is used in the RSRP reporting period, and the polymerization degree remains unchanged.

Figure 3:
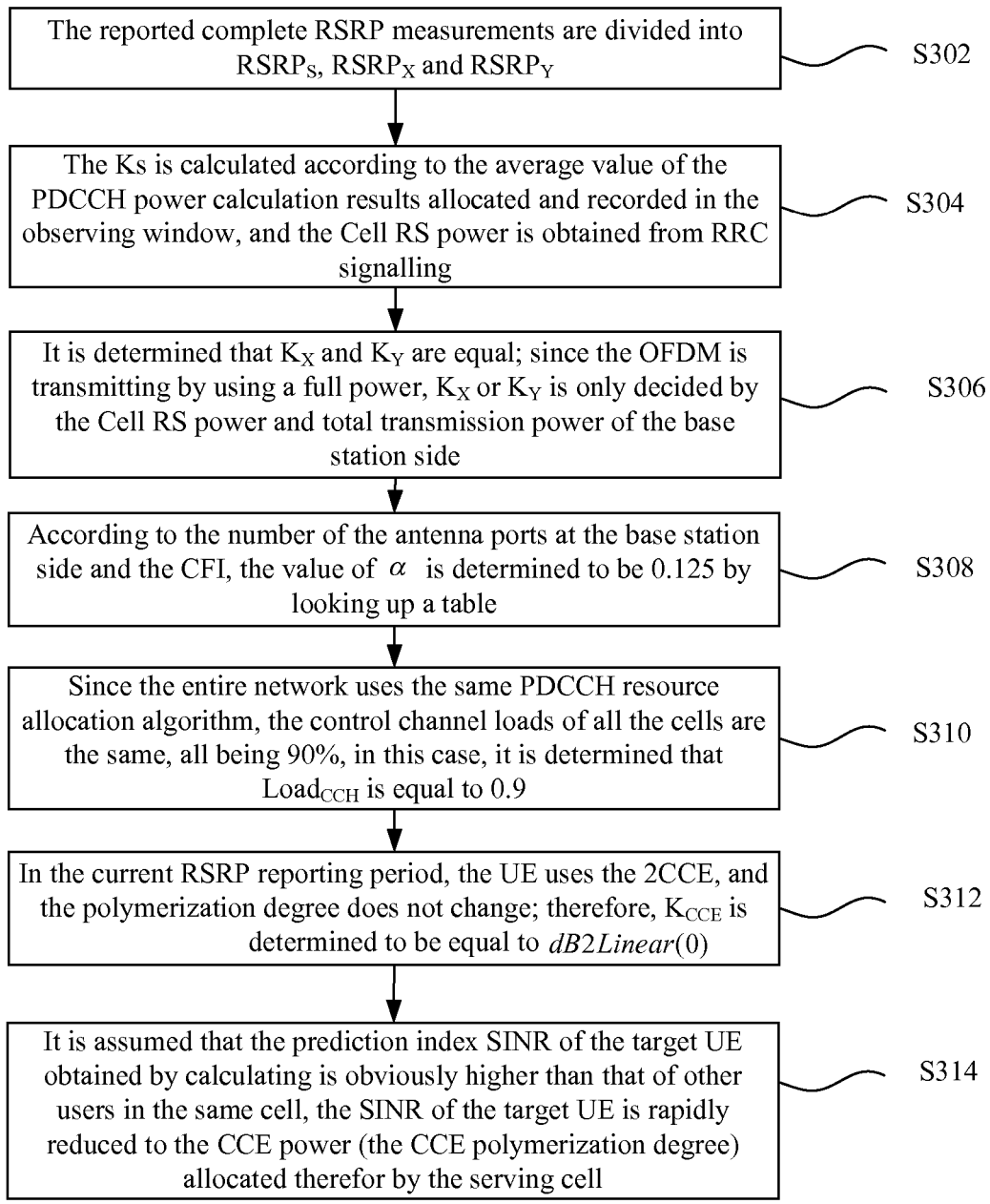
FIG. 3 is a flowchart of quality prediction for a physical downlink control channel of a long term evolution system according to an example embodiment of the present document.

On the basis of the assumed conditions, as shown in FIG. 3 which is a flowchart of quality prediction for a physical downlink control channel of a long term evolution system according to an example embodiment of the present document, the quality prediction method for the PDCCH channel provided by the present example embodiments includes the following steps.

Step S302, after one complete RSRP measurement and reporting, the RSRP measurements are divided into $RSRP_S$, $RSRP_X$ and $RSRP_Y$.

Step S304, since the polymerization degree does not change, the $K_s$ is calculated according to the average value of the PDCCH power calculation results allocated and recorded in the observing window, and the Cell RS power is obtained from RRC signalling.

Step S306, since the single-layer networking and the entire network use the same PDCCH power allocation algorithm, $K_X$ and $K_Y$ are determined to be equal. Since the OFDM is transmitted using a full power, $K_X$ or $K_Y$ is decided by the Cell RS power and total transmission power of the base station side.

Step S308, according to the number of the antenna ports at the base station side and the CFI, the value of a is determined to be 0.125 by looking up a table.

Step S310, since the entire network uses the same PDCCH resource allocation algorithm, the control channel loads of all the cells are the same, all being 90%. In this case, $Load_{CCH}$ is determined to be equal to 0.9.

Step S312, since the UE uses the 2CCE in the entire RSRP reporting period, and the polymerization degree does not change in the current RSRP reporting period, $K_{CCE}$ is determined to be equal to dB2Linear(0).

Step S314, it is assumed that the prediction index SINR of the target UE obtained by calculation is obviously higher than that of other users in the same cell, the SINR of the target UE is rapidly reduced to the CCE power (the CCE polymerization degree) allocated therefor by the serving cell.

By using the quality prediction method for a physical downlink control channel of a long term evolution system provided by the above-mentioned embodiments, more accurate and highly efficient control channel quality prediction can be provided for LTE users without adding measurement and signalling, thereby providing a quick and precise positioning basis for a control channel element (CCE) resource and power allocation algorithm of an Evolved Node B (eNodeB).

Figure 4:
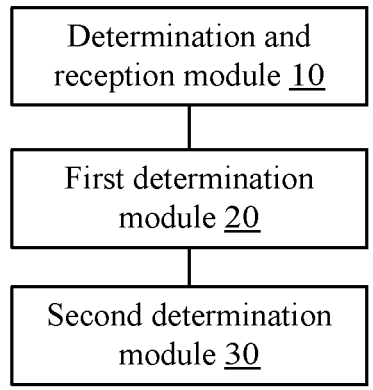
FIG. 4 is a structure diagram of a quality prediction device for a physical downlink control channel of a long term evolution system according to an embodiment of the present document.

FIG. 4 is a structure diagram of a quality prediction device for a physical downlink control channel of a long term evolution system according to an embodiment of the present document. The device may be used for implementing the quality prediction method for a physical downlink control channel of a long term evolution system provided by the above-mentioned embodiments. As shown in FIG. 4, the device mainly includes: a determination and reception module 10, a first determination module 20 and a second determination module 30. The determination and reception module 10 is configured to determine target user equipment (UE) requiring physical downlink control channel (PDCCH) quality prediction and receive information reported by the target UE; the first determination module 20 is coupled with the determination and reception module 10, and is configured to determine a prediction index of the target UE according to the reported information, wherein the prediction index is the signal to interference plus noise ratio (SINR) of the control channel or the equivalent reception level $RP_{PDCCH}$ of the control channel. The second determination module 30 is coupled with the first determination module 20, and is configured to determine the PDCCH quality of the target UE according to the SINR and the $RP_{PDCCH}$.

Figure 5:
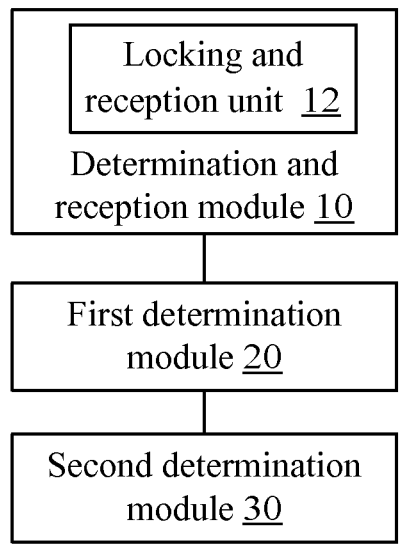
FIG. 5 is a structure diagram of a quality prediction device for a physical downlink control channel of a long term evolution system according to an example embodiment of the present document.

FIG. 5 is a structure diagram of a quality prediction device for a physical downlink control channel of a long term evolution system according to an example embodiment of the present document. As shown in FIG. 5, the determination and reception module 10 in the device may include: a locking and reception unit 12, which is configured to lock the target UE in the target cell and receive the reported information which is obtained by the target UE through measurement, wherein the reported information includes: the reference signal received power (RSRP) of a plurality of cells.

Figure 6:
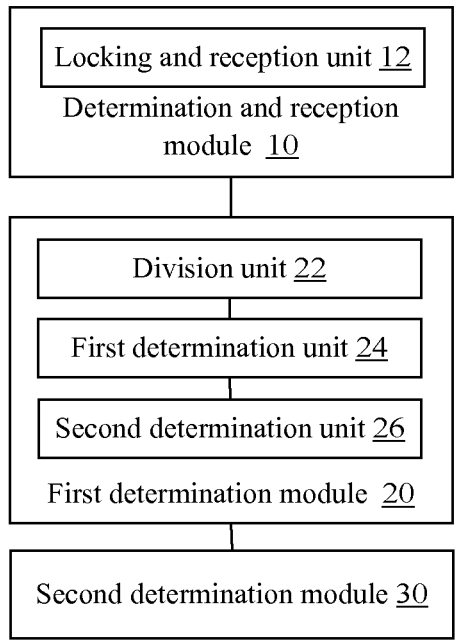
FIG. 6 is a structure diagram of a quality prediction device for a physical downlink control channel of a long term evolution system according to another example embodiment of the present document.

FIG. 6 is a structure diagram of a quality prediction device for a physical downlink control channel of a long term evolution system according to another example embodiment of the present document. As shown in FIG. 6, the first determination module 20 may include: a division unit 22, which is configured to divide the RSRP of the plurality of cells into the RSRP measurement of a serving cell $RSRP_S$, the RSRP measurement of an X-class co-channel interference adjacent cell $RSRP_X$, and the RSRP measurement of a Y-class co-channel interference adjacent cell $RSRP_Y$, wherein the RE pattern occupied by the Cell RS of the X-class co-channel interference adjacent cell is completely identical with the RE pattern occupied by the Cell RS of the target cell, and the RE pattern occupied by the Cell RS of the Y-class co-channel interference adjacent cell is totally different from the RE pattern occupied by the Cell RS of the target cell; a first determination unit 24, which is coupled with the division unit 22 and is configured to determine the actual power offset $K_S$ of the PDCCH of the target UE relative to the Cell RS, the average power offset $K_X$ of the PDCCH of the X-class co-channel interference adjacent cell relative to the Cell RS and the average power offset $K_Y$ of the PDCCH of the Y-class co-channel interference adjacent cell relative to the Cell RS; and a second determination unit 26, which is coupled with the first determination unit 24 and is configured to determine the SINR according to the following formula:

$$SINR = \frac{RSRP_S \cdot K_S}{\sum RSRP_X \cdot K_X + [\alpha \sum RSRP_Y + (1-\alpha)\sum RSRP_Y \cdot K_Y] + N} \frac{1}{\text{Load}_{CCH}} K_{CCE},$$

where $\alpha$ is a ratio of REs occupied by the Cell RS to all interference source REs of the Y-class co-channel interference adjacent cell which are located in a control channel region, N is an additive white noise, $\text{Load}_{CCH}$ is an average load on the control channel of strong interfering cells, and $K_{CCE}$ is a polymerization degree compensation factor and is adjusted according to the demodulation performance of different polymerization degrees.

Figure 7:
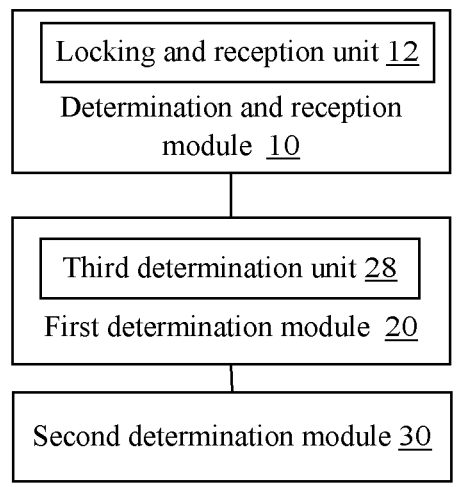
FIG. 7 is a structure diagram of a quality prediction device for a physical downlink control channel of a long term evolution system according to another example embodiment of the present document.

FIG. 7 is a structure diagram of a quality prediction device for a physical downlink control channel of a long term evolution system according to another example embodiment of the present document. As shown in FIG. 7, the first determination module 20 includes: a third determination unit 28, which is configured to determine the $RP_{PDCCH}$ according to the following formula: $RP_{PDCCH}=RSRP_S \ K_S \ K_{CCE}$ wherein $RSRP_S$ is the RSRP measurement of a serving cell, $K_S$ is the actual power offset of the PDCCH of the target UE relative to the Cell RS, and $K_{CCE}$ is a polymerization degree compensation factor and is adjusted according to the demodulation performance of different polymerization degrees.

By using the quality prediction method for a physical downlink control channel of a long term evolution system provided by the above-mentioned embodiments, more accurate and highly efficient control channel quality prediction can be provided for LTE users without adding measurement and signalling, thereby providing a quick and precise positioning basis for a control channel element (CCE) resource and power allocation algorithm of an Evolved Node B (eNodeB).

It can be seen from the above description that the present document implements the following technical effects: using the method of performing quality prediction on the physical downlink control channel according to the signal to interference plus noise ratio (SINR) of the control channel or the equivalent reception level $RP_{PDCCH}$ of the control channel, the problem that an accurate and highly efficient control channel quality prediction method is not given in relevant protocols is solved, so that more accurate and highly efficient control channel quality prediction can be provided for LTE users without adding measurement and signalling, thereby providing a quick and accurate positioning basis for a control channel element (CCE) resource and power allocation algorithm of an Evolved Node B (eNodeB) is achieved.

Apparently, those skilled in the art shall understand that the above modules and steps of the present document can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the present document is not restricted to any particular hardware and software combination.

The above description is only example embodiments of the present document and is not intended to limit the present document, and the present document can have a variety of changes and modifications for ordinary person skilled in the field. Any modification, equivalent replacement, or improvement made within the spirit and principle of the present document shall all fall within the protection scope as defined in the appended claims of the present document.

What is claimed is:

1. A quality prediction method for a physical downlink control channel of a long term evolution system, comprising:

a base station determining target user equipment (UE) requiring physical downlink control channel (PDCCH) quality prediction, and receiving information reported by the target UE;

the base station determining a prediction index of the target UE according to the reported information, wherein the prediction index is a signal to interference plus noise ratio (SINR) of the control channel or an equivalent reception level $RP_{PDCCH}$ of the control channel;

the base station determining PDCCH quality of the target UE according to the SINR or the $RP_{PDCCH}$;

wherein the base station determining the target UE requiring the PDCCH quality prediction and receiving the information reported by the target UE comprise: the base station locking the target UE in a target cell and receiving the reported information which is obtained by the target UE through measurement, wherein the reported information comprises: reference signal received power (RSRP) of a plurality of cells; and wherein the base station determining the SINR of the control channel of the target UE according to the reported information comprises: the base station dividing the RSRP of the plurality of cells into RSRP measurement of a serving cell $RSRP_s$, RSRP measurement of an X-class co-channel interference adjacent cell $RSRP_x$, and RSRP measurement of a Y-class co-channel interference adjacent cell $RSRP_y$, wherein a resource element (RE) pattern occupied by a cell reference signal (Cell RS) of the X-class co-channel interference adjacent cell is identical with an RE pattern occupied by a Cell RS of a target cell, and the RE pattern occupied by a Cell RS of the Y-class co-channel interference adjacent cell is different from the RE pattern occupied by the Cell RS of the target cell;

the base station determining an actual power offset Ks of the PDCCH of the target UE relative to the Cell RS, an average power offset Kx of the PDCCH of the X-class co-channel interference adjacent cell relative to the Cell RS and an average power offset Ky of the PDCCH of the Y-class co-channel interference adjacent cell relative to the Cell RS;

and the base station determining the SINR according to the following formula:

$$SINR = \frac{RSRP_S \cdot K_S}{\sum RSRP_X \cdot K_X + [\alpha \sum RSRP_Y + (1-\alpha)\sum RSRP_Y \cdot K_Y] + N} \cdot \frac{1}{Load_{CCH}} \cdot K_{CCE},$$

where $\alpha$ is a ratio of $RE_s$ occupied by the Cell RS to all interference source $RE_s$ of the Y-class co-channel interference adjacent cell which are located in a control channel region, N is an additive white noise, $Load_{CCH}$ is an average load on the control channel of strong interfering cells, and $K_{CCE}$ is a polymerization degree compensation factor and is adjusted according to demodulation performance of different polymerization degrees.

2. The method according to claim 1, wherein the base station determining the average power offset Kx of the PDCCH of the X-class co-channel interference adjacent cell relative to the Cell RS comprises:

semi-statically calculating the Kx according to a power allocation algorithm of PDCCH of an adjacent cell;

and the base station determining the average power offset Ky of the PDCCH of the Y-class co-channel interference adjacent cell relative to the Cell RS comprises:

semi-statically calculating the Ky according to the power allocation algorithm of PDCCH of an adjacent cell.

3. The method according to claim 1, wherein during the determination of the SINR, the base station determining the value of α comprises:

the base station determining the value of α according to antenna port configuration information of an adjacent cell and control format index (CFI) information indicated by a physical control format index channel (PCFICH).

4. The method according to claim 2, wherein the value of α comprises:

$$\alpha = \begin{cases} 0.125 & CFI = 3 \ \& \ \text{two antenna ports} \\ 0.286 & CFI = 3 \ \& \ \text{four antenna ports} \\ 0.200 & CFI = 2 \ \& \ \text{two antenna ports} \\ 0.500 & CFI = 2 \ \& \ \text{four antenna ports} \end{cases}.$$

5. The method according to claim 1, wherein during the determination of the SINR, the base station determining the value of $Load_{CCH}$ comprises: the base station determining $Load_{CCH}$ according to a load control algorithm of PDCCH of the adjacent cell.

6. A quality prediction method for a physical downlink control channel of a long term evolution system, comprising:

a base station determining target user equipment (UE) requiring physical downlink control channel (PDCCH) quality prediction, and receiving information reported by the target UE;

the base station determining a prediction index of the target UE according to the reported information, wherein the prediction index is a signal to interference plus noise ratio (SINR) of the control channel or an equivalent reception level $RP_{PDCCH}$ of the control channel;

the base station determining PDCCH quality of the target UE according to the SINR or the $RP_{PDCCH}$;

wherein the base station determining the target UE requiring the PDCCH quality prediction and receiving the information reported by the target UE comprise: the base station locking the target UE in a target cell and receiving the reported information which is obtained by the target UE through measurement, wherein the reported information comprises: reference signal received power (RSRP) of a plurality of cells; and wherein the base station determining the equivalent reception level $RP_{PDCCH}$ of the control channel of the target UE according to the reported information comprises:

the base station determining the $RP_{PDCCH}$ according to the following formula:

$RP_{PDCCH} = RSRP_S \cdot K_S \cdot K_{CCE}$, where $RSRP_S$ is RSRP measurement of a serving cell, $K_S$ is an actual power offset of the PDCCH of the target UE relative to a Cell RS, and $K_{CCE}$ is a polymerization degree compensation factor and is adjusted according to demodulation performance of different polymerization degrees.

7. The method according to claim 6 wherein the base station determining the actual power offset $K_S$ of the PDCCH of the target UE relative to the Cell RS comprises:

the base station obtaining, by using a reporting period of each RSRP as an observing window, a downlink scheduling subframe or an uplink grant subframe corresponding to the target UE;

according to the downlink scheduling subframe or the uplink grant subframe, the base station obtaining and recording PDCCH power allocation results;

and the base station judging whether a polymerization degree of the target UE changes in the observing window; if the polymerization degree does not change in the observing window, calculating the Ks according an average value of the PDCCH power allocation results, and if the polymerization degree changes in the observing window, calculating the Ks according a power used by a last updated polymerization degree of the target UE.

8. The method according to claim 6, wherein the base station determining the value of $K_{CCE}$ comprises:

the base station judging whether a CCE polymerization degree allocated by the serving cell for the target UE changes in the reporting period of each RSRP; if the CCE polymerization degree changes in the observing window, then determining a last updated CCE polymerization degree as the $K_{CCE}$, and if the CCE polymerization degree does not change in the observing window, then selecting the value of the $K_{CCE}$ according to the CCE polymerization degree allocated by the serving cell.

9. The method according to claim 8, wherein the value of the $K_{CCE}$ comprises:

$$K_{CCE} = \begin{cases} dB2Linear(-2) & 1CCE \\ dB2Linear(0) & 2CCE \\ dB2Linear(2) & 4CCE \\ dB2Linear(4) & 8CCE. \end{cases}$$

10. A quality prediction device for a physical downlink control channel of a long term evolution system, which is applied in a base station, comprising:

a determination and reception module, which is configured to determine target user equipment (UE) requiring physical downlink control channel (PDCCH) quality prediction, and receive information reported by the target UE;

a first determination module, which is configured to determine a prediction index of the target UE according to the reported information, wherein the prediction index is a signal to interference plus noise ratio (SINR) of the control channel or an equivalent reception level $RP_{PDCCH}$ of the control channel;

and a second determination module, which is configured to determine the PDCCH quality of the target UE according to the SINR and the $RP_{PDCCH}$;

wherein the determination and reception module comprises: a locking and reception unit, which is configured to lock the target UE in a target cell and receive the reported information which is obtained by the target UE through measurement, wherein the reported information comprises: reference signal received power (RSRP) of a plurality of cells;

wherein the first determination module comprises:

a division unit, which is configured to divide the RSRP of the plurality of cells into RSRP measurement of a serving cell $RSRP_S$, RSRP measurement of an X-class co-channel interference adjacent cell $RSRP_X$, and RSRP measurement of a Y-class co-channel interference adjacent cell $RSRP_Y$, wherein a resource element (RE) pattern occupied by a cell reference signal (Cell RS) of the X-class co-channel interference adjacent cell is identical with an RE pattern occupied by a Cell RS of the target cell, and the RE pattern occupied by a Cell RS of the Y-class co-channel interference adjacent cell is different from the RE pattern occupied by the Cell RS of the target cell;

a first determination unit, which is configured to determine an actual power offset Ks of the PDCCH of the target UE relative to the Cell RS, an average power offset $K_X$ of the PDCCH of the X-class co-channel interference adjacent cell relative to the Cell RS and an average power offset $K_Y$ of the PDCCH of the Y-class co-channel interference adjacent cell relative to the Cell RS;

and a second determination unit, which is configured to determine the SINR according to the following formula:

$$SINR = \frac{RSRP_S \cdot K_S}{\sum RSRP_X \cdot K_X + [\alpha \sum RSRP_Y + (1-\alpha)\sum RSRP_Y \cdot K_Y] + N} \cdot \frac{1}{Load_{CCH}} \cdot K_{CCE},$$

where $\alpha$ is a ratio of $RE_s$ occupied by the Cell RS to all interference source $RE_s$ of the Y-class co-channel interference adjacent cell which are located in a control channel region, N is an additive white noise, $Load_{CCH}$ is an average load on the control channel of strong interfering cells, and $K_{CCE}$ is a polymerization degree compensation factor and is adjusted according to demodulation performance of different polymerization degrees.

11. The device according to claim 10, wherein the first determination module comprises:

a third determination unit, which is configured to determine the $RP_{PDCCH}$ according to the following formula: $RP_{PDCCH} = RSRP_S \cdot K_S \cdot K_{CCE}$, where $RSRP_S$ is RSRP measurement of a serving cell, $K_s$ is an actual power offset of the PDCCH of the target UE relative to the Cell RS, and $K_{CCE}$ is a polymerization degree compensation factor and is adjusted according to demodulation performance of different polymerization degrees.

12. The method according to claim 6, wherein the base station determining the actual power offset Ks of the PDCCH of the target UE relative to the Cell RS comprises:

the base station obtaining, by using a reporting period of each RSRP as an observing window, a downlink scheduling subframe or an uplink grant subframe corresponding to the target UE;

according to the downlink scheduling subframe or the uplink grant subframe, the base station obtaining and recording PDCCH power allocation results;

and the base station judging whether a polymerization degree of the target UE changes in the observing window; if the polymerization degree does not change in the observing window, calculating the Ks according an average value of the PDCCH power allocation results, and if the polymerization degree changes in the observing window, calculating the Ks according a power used by a last updated polymerization degree of the target UE.

13. The method according to claim 6, wherein the base station determining the value of $K_{CCE}$ comprises:

the base station judging whether a CCE polymerization degree allocated by the serving cell for the target UE changes in the reporting period of each RSRP; if the CCE polymerization degree changes in the observing window, then determining a last updated CCE polymerization degree as the $K_{CCE}$, and if the CCE polymerization degree does not change in the observing window, then selecting the value of the $K_{CCE}$ according to the CCE polymerization degree allocated by the serving cell.

14. The method according to claim 13, wherein the value of the $K_{CCE}$ comprises:

$$K_{CCE} = \begin{cases} dB2Linear(-2) & 1CCE \\ dB2Linear(0) & 2CCE \\ dB2Linear(2) & 4CCE \\ dB2Linear(4) & 8CCE. \end{cases}$$

* * * * *